US012766863B2

United States Patent
(12) United States Patent
Ohira et al.

(10) Patent No.: US 12,766,863 B2
(45) Date of Patent: Oct. 20, 2026

(54) PRINTING APPARATUS

(71) Applicant: SCREEN Holdings Co., Ltd., Kyoto (JP)

(72) Inventors: Junki Ohira, Kyoto (JP); Hirotake Nishimura, Kyoto (JP); Koichi Ueno, Kyoto (JP); Hiroki Yamaguchi, Kyoto (JP); Katsuaki Takeuchi, Kyoto (JP); Yuta Ikeda, Kyoto (JP); Yoshitomo Wada, Kyoto (JP); Masataka Yoshihara, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 88 days.

(21) Appl. No.: 19/041,013

(22) Filed: Jan. 30, 2025

(65) Prior Publication Data

US 2025/0296371 A1 Sep. 25, 2025

(30) Foreign Application Priority Data

Mar. 25, 2024 (JP) ................................ 2024-047627

(51) Int. Cl.
*B41J 15/16* (2006.01)
*B41J 11/04* (2006.01)
*B41J 15/04* (2006.01)

(52) U.S. Cl.
CPC ............ *B41J 15/16* (2013.01); *B41J 15/048* (2013.01); *B41J 2203/01* (2020.08)

(58) Field of Classification Search
CPC . B41J 15/16; B41J 15/165; B41J 15/00; B41J 13/02; B41J 13/076; B41J 11/04
See application file for complete search history.

(56) References Cited

U.S. PATENT DOCUMENTS 3,405,855 A * 10/1968 Daly ......................... D21F 1/36 226/193
8,028,988 B2 * 10/2011 Shakespeare .......... B65H 20/02 492/30
2022/0063301 A1 3/2022 Tsutsui et al.

FOREIGN PATENT DOCUMENTS

JP 2022-037537 A 3/2022
WO WO-2022070383 A1 * 4/2022 ................ B41J 2/01

OTHER PUBLICATIONS

Tsutsui, Machine TranslationofWO-2022070383-A1, 2022 (Year: 2022).*

* cited by examiner

*Primary Examiner* — Scott A Richmond
(74) *Attorney, Agent, or Firm* — Rimon P.C.

(57) ABSTRACT

There is provided a technique capable of easily identifying a deformed idler roller when strong tension is applied to a print medium and of suppressing the deformation of some important idler rollers. A printing apparatus includes a transport mechanism having multiple idler rollers. At least one of the idler rollers is a sacrificial roller that is more deformable than the other idler rollers. When strong tension is applied to the print medium, the sacrificial roller becomes deformed in preference to the other idler rollers. This allows the deformed idler roller to be easily identified, and suppresses the deformation of the idler rollers other than the sacrificial roller.

7 Claims, 6 Drawing Sheets

PRINTING APPARATUS

RELATED APPLICATIONS

This application claims the benefit of Japanese Application No. 2024-047627, filed on Mar. 25, 2024, the disclosure of which is incorporated by reference herein.

BACKGROUND OF THE INVENTION

Field of the Invention

The present invention relates to an inkjet printing apparatus.

Description of the Background Art

A printing apparatus for printing using an inkjet method on a surface of an elongated strip-shaped print medium while transporting the print medium in a longitudinal direction thereof has heretofore been known. The printing apparatus includes multiple rollers for transporting the print medium. The multiple rollers include drive rollers that rotate under power of a motor, and idler rollers which rotate as the print medium moves.

A conventional printing apparatus is disclosed, for example, in Japanese Patent Application Laid-Open No. 2022-37537.

In this type of printing apparatus, excessive tension is applied to the print medium when a section for unwinding or winding the print medium performs an abnormal operation. As a result, one or more of the idler rollers may deform. In that case, it takes time to identify the deformed idler rollers from among the multiplicity of idler rollers. This has made it necessary for the printing apparatus to stop for a long time.

In addition, there is a desire to protect some important idler rollers such as idler rollers used for encoders against deformation even if excessive tension is applied to the print medium.

SUMMARY OF THE INVENTION

It is therefore an object of the present invention to provide a technique capable of easily identifying a deformed idler roller when strong tension is applied to a print medium and of suppressing the deformation of some important idler rollers.

The present invention is intended for a printing apparatus.

According to the present invention, the printing apparatus comprises: a transport mechanism for transporting an elongated strip-shaped print medium in a longitudinal direction thereof; a head for ejecting ink onto the print medium being transported by the transport mechanism; and a control unit for controlling the transport mechanism and the head. The transport mechanism includes a drive roller rotating actively under power outputted from a motor, and multiple idler rollers driven to rotate in accordance with the movement of the print medium. At least one of the multiple idler rollers is a sacrificial roller that is more deformable than the other idler rollers.

When strong tension is applied to the print medium, the sacrificial roller becomes deformed in preference to the other idler rollers. This allows the deformed idler roller to be easily identified, and suppresses the deformation of the idler rollers other than the sacrificial roller.

Preferably, the printing apparatus further comprises a housing having an inlet and an outlet for the print medium and for accommodating the transport mechanism and the head therein, wherein the sacrificial roller is located near the inlet or the outlet within the housing.

This allows a user to easily check the state of the sacrificial roller. In addition, it is easy to replace the deformed sacrificial roller with a new sacrificial roller.

Preferably, the sacrificial roller is the second idler roller counting from the inlet or the outlet among the multiple idler rollers.

Locating the sacrificial roller near the inlet or the outlet allows the winding angle of the print medium to be kept substantially constant relative to the sacrificial roller.

Preferably, the printing apparatus further comprises a tension sensor for detecting the tension of the print medium, wherein the control unit extracts a varying component of tension corresponding to the sacrificial roller from time-series data about tension outputted from the tension sensor to detect the deformation of the sacrificial roller, based on the varying component.

The deformation of the sacrificial roller is detectable by the control unit.

Preferably, the diameter of an outer peripheral surface of the sacrificial roller that comes into contact with the print medium has a value that is neither an integral multiple nor an integral fraction of the diameter of an outer peripheral surface of the other idler rollers that comes into contact with the print medium.

This configuration allows the variation period of tension resulting from the sacrificial roller to differ from the variation period of tension resulting from the other idler rollers. Thus, the varying component of tension corresponding to the sacrificial roller is accurately extracted from the time-series data about tension.

Preferably, the sacrificial roller includes a shaft extending along a central axis thereof, and the shaft has a constricted section.

Preferably, aid sacrificial roller includes a shaft extending along a central axis thereof, and the shaft has a cavity formed therein.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

<1. Configuration of Printing Apparatus>

Figure 1:
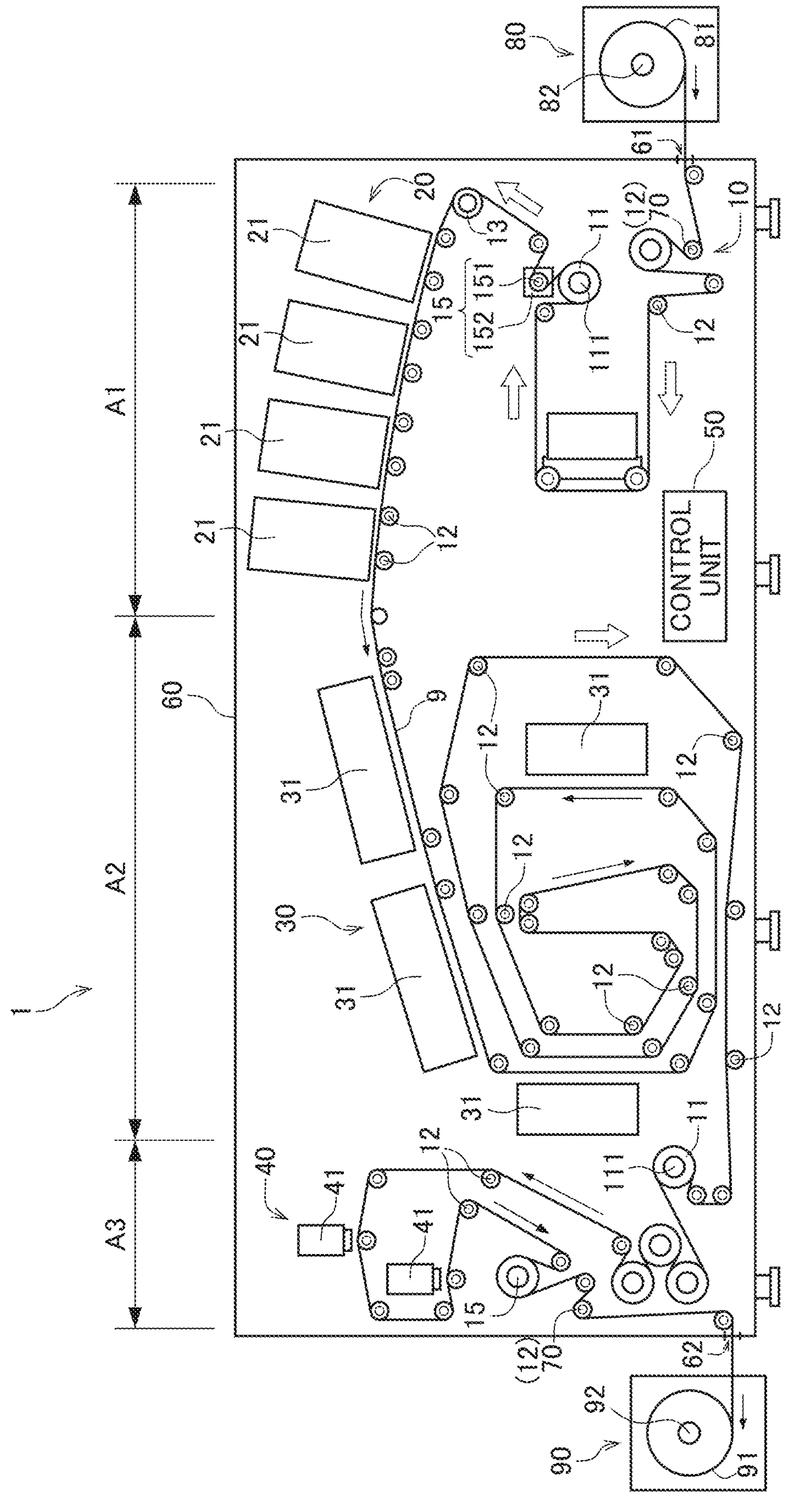
FIG. 1 is a diagram showing a configuration of a printing apparatus.

FIG. 1 is a diagram showing a configuration of a printing apparatus 1 according to one preferred embodiment of the present invention. This printing apparatus 1 is a apparatus for printing using an inkjet method on an elongated strip-shaped print medium 9. The printing apparatus 1 prints an image on a surface of the print medium 9 by ejecting ink from multiple heads 21 onto the print medium 9 while transporting the print medium 9 in a longitudinal direction thereof. The print medium 9 may be printing paper or a resin film. As shown in FIG. 1, the printing apparatus 1 includes a housing 60, a transport mechanism 10, an encoder 13, a tension sensor 15, a printing section 20, a drying section 30, an inspection section 40, a control unit 50, an unwinding section 80, and a winding section 90.

The housing 60 is casing that accommodates the transport mechanism 10, the encoder 13, the tension sensor 15, the printing section 20, the drying section 30, and the inspection section 40 therein. The housing 60 includes an inlet 61 for transport of the print medium 9 therethrough into the housing 60, and an outlet 62 for transport of the print medium 9 therethrough out of the housing 60. As shown in FIG. 1, the printing apparatus 1 of the present preferred embodiment includes a printing area A1, a drying area A2, and an inspection area A3 within the housing 60. The printing area A1, the drying area A2, and the inspection area A3 are arranged in the direction from the inlet 61 to the outlet 62.

The unwinding section 80 is disposed outside the inlet 61 of the housing 60. The unwinding section 80 includes an unwinding roll 81 having the print medium 9 wound therearound prior to printing in the printing section 20 in the form of a roll, and a motor not shown for rotating the unwinding roll 81 around a rotation axis 82 to unwind the print medium 9 from the unwinding roll 81 in the direction of an arrow.

The winding section 90 is disposed outside the outlet 62 of the housing 60. The winding section 90 includes a winding roll 91 having the print medium 9 wound therearound subjected to printing in the printing section 20 in the form of a roll, and a motor not shown for rotating the winding roll 91 around a rotation axis 92 to move the print medium 9 transported out of the housing 60 in the direction of an arrow.

The transport mechanism 10 is a mechanism for transporting the print medium 9 within the housing 60. The transport mechanism 10 of the present preferred embodiment includes multiple drive rollers 11 and multiple idler rollers 12. The print medium 9 runs over the multiple drive rollers 11 and the multiple idler rollers 12 in a tensioned state.

The print medium 9 is unwound from the unwinding roll 81 disposed outside the inlet 61, and is transported along a transport path formed by the multiple drive rollers 11 and the multiple idler rollers 12. Each of the drive and idler rollers 11 and 12 rotates around an axis parallel to the width direction (a horizontal direction perpendicular to the transport direction) of the print medium 9 to guide the print medium 9 downstream along the transport path. The transported print medium 9 is wound and collected on the winding roll 91 disposed outside the outlet 62.

The drive rollers 11 are disposed at multiple locations along the transport path. Each of the drive rollers 11 has a cylindrical outer peripheral surface. The print medium 9 comes into contact with the outer peripheral surface of each of the drive rollers 11. The drive rollers 11 are connected to respective motors 111. The drive rollers 11 rotate actively by power supplied from the respective motors 111. This causes the print medium 9 to move downstream along the transport path.

The idler rollers 12 are disposed at multiple locations along the transport path. The number of idler rollers 12 is greater than the number of drive rollers 11. Each of the idler rollers 12 has a cylindrical outer peripheral surface. The print medium 9 comes into contact with the outer peripheral surface of each of the idler rollers 12. As the print medium 9 is transported by the drive rollers 11, the idler rollers 12 are driven to rotate in accordance with the movement of the print medium 9.

The encoder 13 is a sensor for detecting the transport speed of the print medium 9. The encoder 13 is connected to one of the idler rollers 12. The encoder 13 is electrically connected to the control unit 50. The encoder 13 detects the rotation angle of the idler roller 12. Specifically, the encoder 13 outputs a pulse signal each time the idler roller 12 rotates through a predetermined angle. The pulse signal is transmitted from the encoder 13 to the control unit 50.

The tension sensor 15 is a sensor for detecting the tension applied to the print medium 9. The tension sensor 15 is provided on the transport path of the print medium 9. The tension sensor 15 includes a sensor roller 151 coming into contact with the print medium 9, and a load cell 152 connected to the sensor roller 151. The load cell 152 measures the load applied to the sensor roller 151 from the print medium 9. Based on the measured load, the tension sensor 15 to detect the tension of the print medium 9. Then, the tension sensor 15 transmits a detection signal indicating the tension of the print medium 9 to the control unit 50.

The printing section 20 is a unit for ejecting droplets of ink (referred to hereinafter as "ink droplets") onto the print medium 9 being transported by the transport mechanism 10. The printing section 20 is provided in the printing area A1 within the housing 60. The printing section 20 according to the present preferred embodiment includes four heads 21. The four heads 21 are arranged in spaced apart relation in the transport direction of the print medium 9. The print medium 9 is transported under the four heads 21, with a printing surface thereof facing upward.

Figure 2:
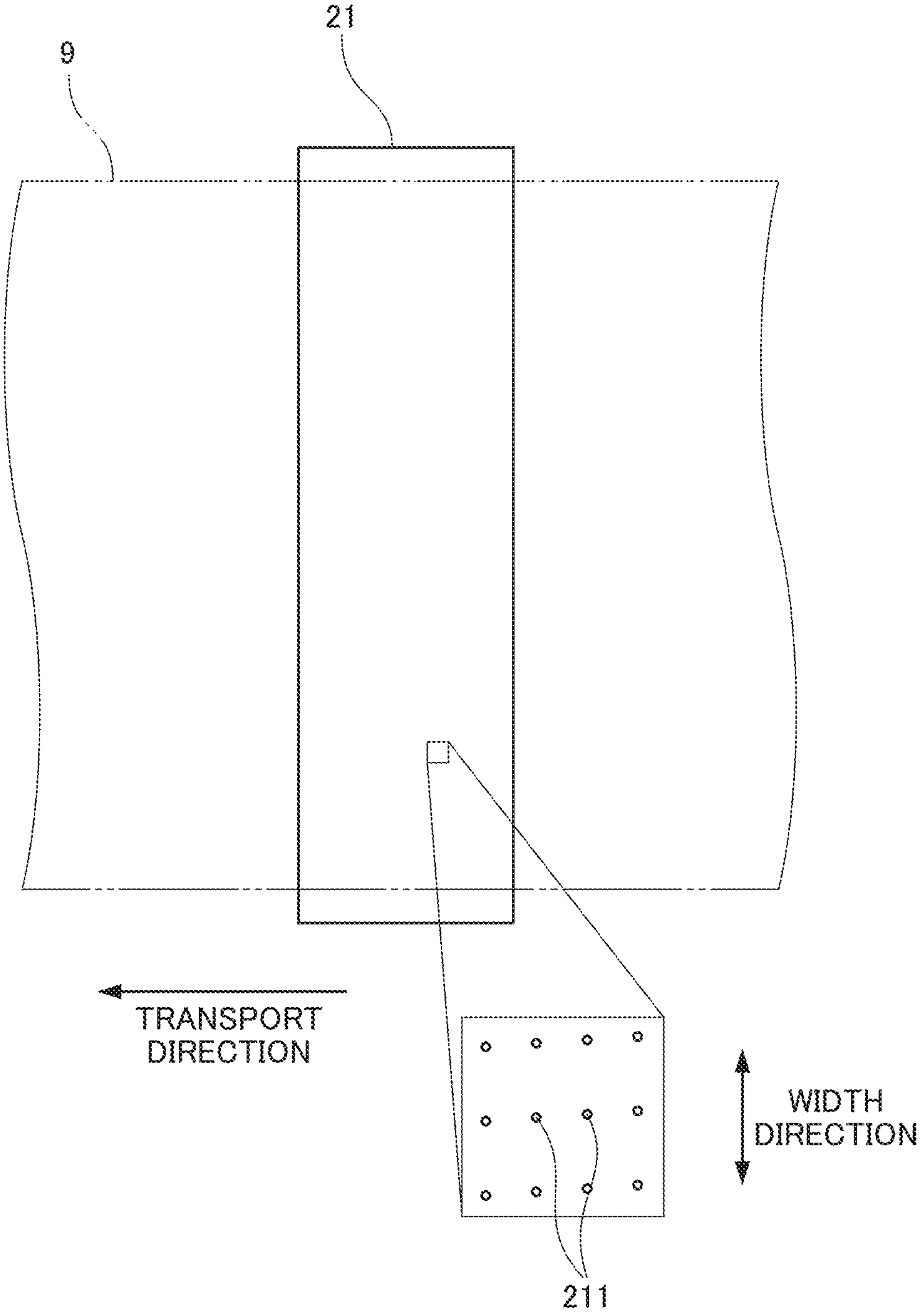
FIG. 2 is a bottom view of one head.

FIG. 2 is a bottom view of one head 21. In FIG. 2, the print medium 9 is shown in imaginary lines (dash-double-dot lines). As shown on an enlarged scale in FIG. 2, the head 21 has a lower surface provided with multiple nozzles 211 capable of ejecting ink droplets. In the present preferred embodiment, the nozzles 211 are arranged two-dimensionally in the transport direction and in the width direction in the lower surface of the head 21. The nozzles 211 are displaced in relation to each other in the width direction. However, the nozzles 211 may be aligned in a line in the width direction.

The four heads 21 eject ink droplets of different colors from the nozzles 211 toward the upper surface of the print medium 9. For example, the four heads 21 respectively eject black, cyan, magenta and yellow ink. Then, a multi-color image is formed on the surface of the print medium 9 by superimposing single-color images formed by the ink of the respective colors.

The drying section 30 is a unit for drying the ink on the print medium 9. The drying section 30 is provided in the drying area A2 within the housing 60. The drying section 30 includes multiple heaters 31. The heaters 31 irradiate the print medium 9 with infrared light. This causes a solvent to vaporize from the ink on the print medium 9. As a result, the ink dries and is fixed to the print medium 9. However, the heaters 31 may be configured to heat the ink by blowing a heated warm air onto the print medium 9, for example.

The inspection section 40 is a unit for inspecting an image printed on the print medium 9. The inspection section 40 is provided in the inspection area A3 within the housing 60. The inspection section 40 includes multiple cameras 41. The cameras 41 photograph the surface of the print medium 9 to transmit resultant inspection images to the control unit 50. The control unit 50 inspects whether the image printed on the print medium 9 is good or bad, based on the inspection images received from the cameras 41.

Figure 3:
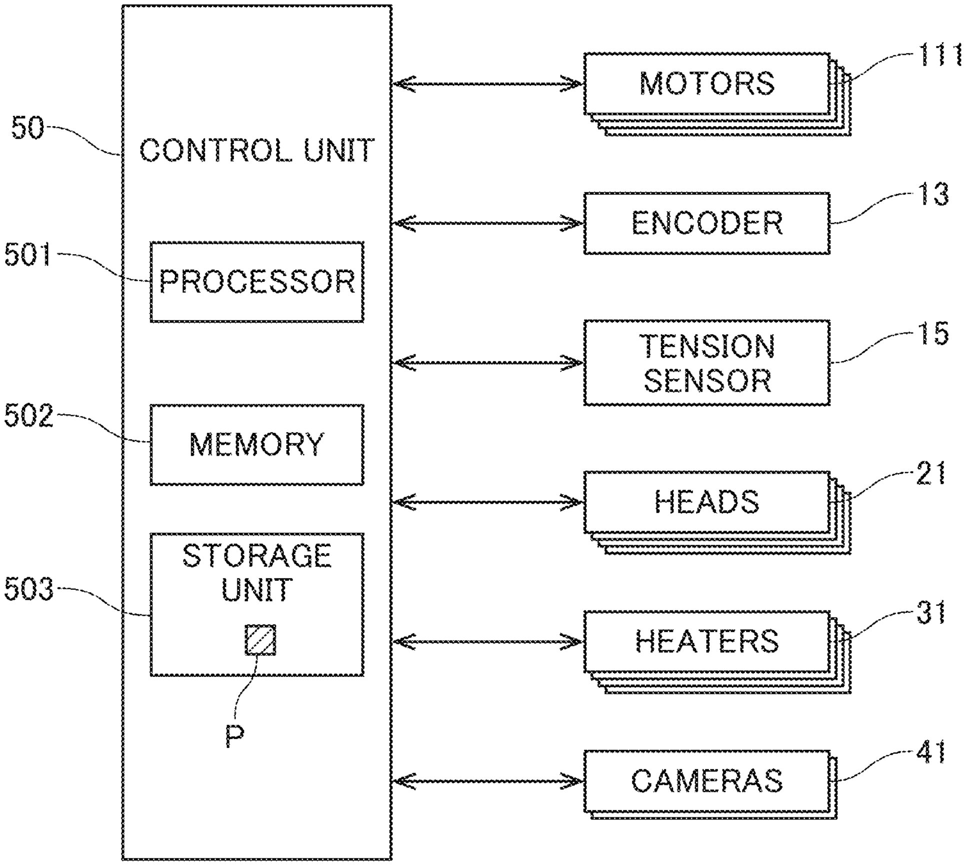
FIG. 3 is a control block diagram of the printing apparatus.

The control unit 50 is an information processing device for controlling the parts of the printing apparatus 1. FIG. 3 is a control block diagram of the printing apparatus 1. As shown in FIG. 3, the control unit 50 is implemented as a computer including a processor 501 such as a CPU, a memory 502 such as a RAM, and a storage unit 503 such as a hard disk drive. A computer program P for execution of a printing process is stored in the storage unit 503.

As shown in FIG. 3, the control unit 50 is connected to the motors 111, the encoder 13, the tension sensor 15, the four heads 21, the heaters 31, and the cameras 41 described above and can communicate with them via wired or wireless connections. The control unit 50 reads the computer program P from the storage unit 503 onto the memory 502 to operate the processor 501 in accordance with the computer program P, thereby controlling each of the aforementioned parts. This causes the transport of the print medium 9 and the printing process to proceed.

<2. Sacrificial Roller>

The aforementioned idler rollers 12 include at least one sacrificial roller 70. In the present preferred embodiment, two of the multiple idler rollers 12 are sacrificial rollers 70. The sacrificial rollers 70 are rollers that are more deformable than the other idler rollers 12. One of the two sacrificial rollers 70 is located near the inlet 61 of the housing 60. The other of the two sacrificial rollers 70 is located near the outlet 62 of the housing 60.

Figure 4:
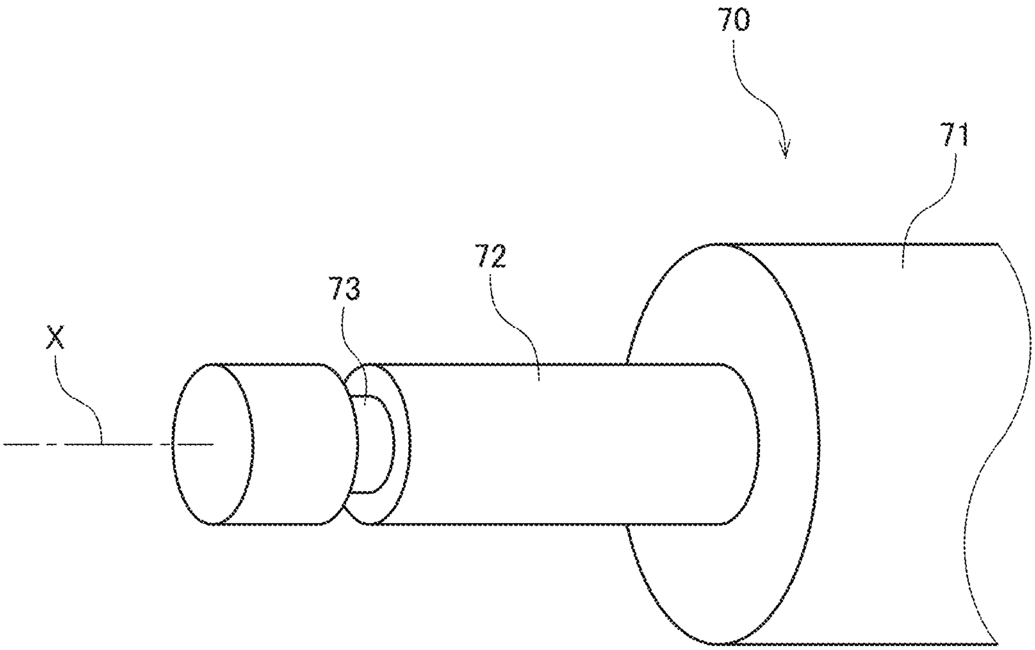
FIG. 4 is a perspective view of the vicinity of an end portion of a sacrificial roller.

FIG. 4 is a perspective view of the vicinity of an end portion of such a sacrificial roller 70. As shown in FIG. 4, the sacrificial roller 70 includes a roller body 71 in the form of a hollow cylinder, and a shaft 72 in the form of a solid cylinder and supporting the roller body 71. The print medium 9 comes in contact with an outer peripheral surface of the roller body 71. The shaft 72 protrudes from both end portions of the roller body 71 along a central axis X of the sacrificial roller 70. The outside diameter of the shaft 72 is smaller than that of the roller body 71. An end portion of the shaft 72 is supported by an inner wall of the housing 60.

As shown in FIG. 4, the shaft 72 has a constricted section 73. The constricted section 73 is an annular recess formed in an outer peripheral surface of the shaft 72. The constricted section 73 is not a recess provided for fixing to other parts. The constricted section 73 is hence used in an open state without engagement with other parts. The outside diameter of the constricted section 73 is smaller than that of other sections of the shaft 72. For this reason, when an external force is exerted on the shaft 72, the constricted section 73 becomes deformed more easily than other sections of the shaft 72 due to stress concentration. The shafts of the idler rollers 12 other than the sacrificial rollers 70 do not have such a constricted section 73.

For example, if an operation abnormality occurs in the unwinding section 80 or the winding section 90, the tension applied to the print medium 9 becomes greater than normal. The greater tension of the print medium 9 causes pressure stronger than normal to be applied to each of the multiple idler rollers 12. In such a case, the constricted section 73 of the sacrificial roller 70 becomes deformed in preference to the other idler rollers 12.

In conventional printing apparatus, when some of the idler rollers 12 are deformed due to excessive tension applied to the print medium 9, it has been difficult to identify the deformed idler rollers 12 from among the multiplicity of idler rollers 12 because of the absence of such a sacrificial roller 70. For the identification of the deformed idler rollers 12, it has hence been necessary to stop the printing apparatus 1 for a long time. However, in this printing apparatus 1, the sacrificial roller 70 becomes deformed preferentially among the multiplicity of idler rollers 12. This allows the deformed idler roller 12 to be easily identified.

In addition, when excessive tension is applied to the print medium 9, the sacrificial roller 70 is deformed preferentially, whereby the deformation of the idler rollers 12 other than the sacrificial roller 70 is suppressed. This protects important idler rollers 12, the deformation of which is especially undesired. For example, if an idler roller 12 connected to the encoder 13 is deformed, the detection accuracy of the encoder 13 decreases. However, the structure of the present preferred embodiment is provided with the sacrificial roller 70 to suppress the deformation of the idler roller 12 connected to the encoder 13. Thus, the decrease in the detection accuracy of the encoder 13 is suppressed even when excessive tension is applied to the print medium 9.

The angle around the axis of rotation of part of the outer peripheral surface of each of the idler rollers 12 which comes into contact with the print medium 9 is referred to hereinafter as a "winding angle". It is desirable that the winding angle of the sacrificial roller 70 is greater than that of the other idler rollers 12. Specifically, it is desirable that the winding angle of the sacrificial roller 70 is greater than 90 degrees. This allows pressure to be efficiently applied to the sacrificial roller 70 from the print medium 9. Thus, the sacrificial roller 70 is made more deformable when excessive tension is applied to the print medium 9.

In the present preferred embodiment, one of the two sacrificial rollers 70 is located near the inlet 61 of the housing 60. Specifically, one of the two sacrificial rollers 70 is located between the inlet 61 and the heads 21 of the printing section 20 and is in a position closer to the inlet 61 than to the heads 21. The other of the two sacrificial rollers 70 is located near the outlet 62 of the housing 60. Specifically, the other of the two sacrificial rollers 70 is located between the outlet 62 and the cameras 41 of the inspection section 40, and is in a position closer to the outlet 62 than to the cameras 41.

In this manner, locating the sacrificial rollers 70 near the inlet 61 or the outlet 62 allows a user to easily visually check whether the sacrificial rollers 70 have been deformed or not. In addition, if such a sacrificial roller 70 is deformed, it is easy to replace the deformed sacrificial roller 70 with a new sacrificial roller 70.

However, if the transport layout within the unwinding section 80 is changed, the transport angle of the print medium 9 being transported into the inlet 61 is also changed. In the example of the unwinding section 80 shown in FIG. 1, for example, the print medium 9 is transported from the lower surface of the horizontally supported unwinding roll 81. Depending on the unwinding section 80, however, there are cases in which the print medium 9 is transported from the upper surface of the horizontally supported unwinding roll 81. As a result, the winding angle of the idler roller 12 closest to the inlet 61 varies in accordance with the form that the unwinding section 80 can take. The winding angle of the idler roller 12 closest to the inlet 61 also varies when the diameter of the unwinding roll 81 varies as the print medium 9 is unwound. In the present preferred embodiment, the sacrificial roller 70 is not the idler roller 12 closest to the inlet 61 but an idler roller 12 adjacent to and downstream of the idler roller 12 closest to the inlet 61. In other words, the second idler roller 12 counting from the inlet 61 is the sacrificial roller 70. This allows the winding angle of the print medium 9 relative to the sacrificial roller 70 to be kept constant even if the layout within the unwinding section 80 is changed or the diameter of the unwinding roll 81 varies as the print medium 9 is consumed.

Similarly, if the transport layout within the winding section 90 is changed, the transport angle of the print medium 9 being transported out of the outlet 62 is also changed. As a result, the winding angle of the idler roller 12 closest to the outlet 62 varies in accordance with the form that the winding section 90 can take. The winding angle of the idler roller 12 closest to the outlet 62 also varies when the diameter of the winding roll 91 varies as the print medium 9 is wound. In the present preferred embodiment, the other sacrificial roller 70 is not the idler roller 12 closest to the outlet 62 but an idler roller 12 adjacent to and upstream of the idler roller 12 closest to the outlet 62. In other words, the second idler roller 12 counting from the outlet 62 is the other sacrificial roller 70. This allows the winding angle of the print medium 9 relative to the other sacrificial roller 70 to be kept constant.

<3. Method of Detecting Deformation of Sacrificial Roller>

Figure 5:
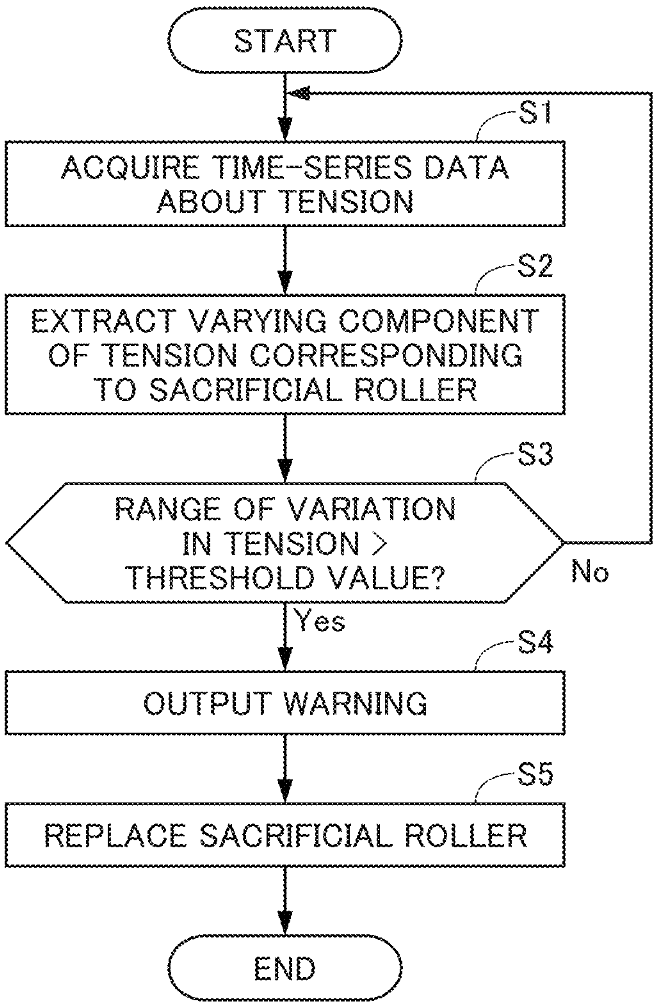
FIG. 5 is a flow diagram showing a procedure for detecting the deformation of the sacrificial roller.

Subsequently, a method of detecting the deformation of such a sacrificial roller 70 in this printing apparatus 1 will be described. FIG. 5 is a flow diagram showing a procedure for detecting the deformation of the sacrificial roller 70.

In this printing apparatus 1, the tension sensor 15 detects the tension in the transport direction applied to the print medium 9 during the transport of the print medium 9. The tension sensor 15 transmits a detection signal indicating the tension of the print medium 9 to the control unit 50. The tension sensor 15 continually performs such detection operations at short time intervals. As a result, the control unit 50 acquires time-series data indicating changes in tension over time (Step S1).

The control unit 50 performs frequency analysis using Fourier transform on the acquired time-series data about tension. This extracts a varying component of tension corresponding to the sacrificial roller 70 from the aforementioned time-series data (Step S2). The varying component of tension resulting from the sacrificial roller 70 has a period corresponding to the circumference of the roller body 71 of the sacrificial roller 70.

For easier distinction between the varying component of tension corresponding to the sacrificial roller 70 and a varying component of tension corresponding to the other idler rollers 12 in Step S2, the diameter of the outer peripheral surface of the sacrificial roller 70 which comes in contact with the print medium 9 may be made different from the diameter of the outer peripheral surface of the other idler rollers 12 which comes in contact with the print medium 9. Specifically, the diameter of the outer peripheral surface of the sacrificial roller 70 that comes into contact with the print medium 9 may have a value that is neither an integral multiple nor an integral fraction of the diameter of the outer peripheral surface of the other idler rollers 12 which comes in contact with the print medium 9. This makes it difficult for the variation period of tension resulting from the sacrificial roller 70 to overlap the variation period of tension resulting from the other idler rollers 12. Thus, the varying component of tension corresponding to the sacrificial roller 70 is accurately extracted from the time-series data about tension.

Thereafter, the control unit 50 judges whether the range of variation in tension corresponding to the sacrificial roller 70 has become greater than a previously set threshold value or not (Step S3). If the range of variation in tension corresponding to the sacrificial roller 70 is not greater than the threshold value, the control unit 50 judges that the sacrificial roller 70 has not been deformed (No in Step S3). In this case, the procedure returns to Step S1, and the processes in Steps S1 to S3 are repeated.

On the other hand, if the range of variation in tension corresponding to the sacrificial roller 70 is greater than the threshold value, the control unit 50 judges that the sacrificial roller 70 has been deformed (Yes in Step S3). In this case, the control unit 50 outputs a warning (Step S4). The warning output may be a warning message displayed on a display device or the sounding of an audible alarm. Alternatively, the warning output may be warning information transmitted to other information terminals connected via a network.

If the warning is outputted, the user stops the printing apparatus 1, and checks the state of the constricted section 73 of the sacrificial roller 70. Then, if the constricted section 73 of the sacrificial roller 70 is deformed, the user replaces the sacrificial roller 70 with a new sacrificial roller 70 (Step S5). At this time, the user need not check each of the many idler rollers 12 individually but can preferentially check the sacrificial roller 70. This shortens the time required for the checking operation to allow the operation of the printing apparatus 1 to restart early.

<4. Modifications>

While the one preferred embodiment according to the present invention has been described hereinabove, the present invention is not limited to the aforementioned preferred embodiment.

Figure 6:
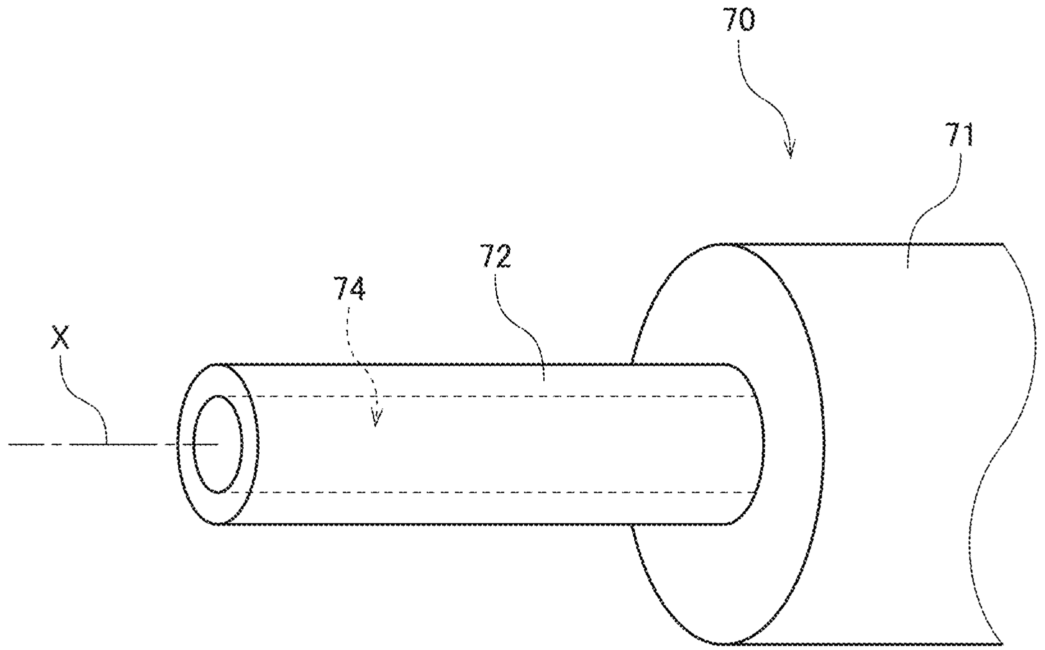
FIG. 6 is a perspective view of the vicinity of an end portion of the sacrificial roller.

FIG. 6 is a perspective view of the vicinity of an end portion of a sacrificial roller 70 having a structure different from that of the aforementioned preferred embodiment. In the aforementioned preferred embodiment, the sacrificial roller 70 includes the shaft 72 having the constricted section 73. The sacrificial roller 70, however, may have a structure different from the constricted section 73. In the example of FIG. 6, the sacrificial roller 70 includes the shaft 72 having the shape of a hollow cylinder. Specifically, the sacrificial roller 70 of FIG. 6 has a hollow structure including a cavity 74 formed therein, although each of the idler rollers 12 other than the sacrificial roller 70 includes the shaft 72 having the shape of a solid cylinder. Even such a structure is capable of preferentially deforming the shaft 72 of the sacrificial roller 70 when excessive tension is applied to the print medium 9.

Another structure may be such that the shaft 72 of the sacrificial roller 70 is provided with a notch. Still another structure may be such that the shaft 72 of the sacrificial roller 70 is made of a material that is more deformable than the shafts of the other idler rollers 12.

In the aforementioned preferred embodiment, the printing apparatus 1 includes the two sacrificial rollers 70. However, the number of sacrificial rollers 70 included in the multiple idler rollers 12 may be one or not less than three. In other words, at least one of the multiple idler rollers 12 may be the sacrificial roller 70.

The printing apparatus 1 of the aforementioned preferred embodiment includes the four heads 21. However, the number of heads 21 provided in the printing apparatus 1 may be in the range of one to three or not less than five. For example, the printing apparatus 1 may include a head 21 for ejecting ink of a spot color in addition to C, M, Y, and K.

The components described in the aforementioned preferred embodiment and in the modifications may be consistently combined together, as appropriate.

While the invention has been shown and described in detail, the foregoing description is in all aspects illustrative and not restrictive. It is therefore understood that numerous modifications and variations can be devised without departing from the scope of the invention.

What is claimed is:

1. A printing apparatus comprising:

a transport mechanism for transporting an elongated strip-shaped print medium in a longitudinal direction thereof;

a head for ejecting ink onto said print medium being transported by said transport mechanism; and a control unit for controlling said transport mechanism and said head, said transport mechanism including a drive roller rotating actively under power outputted from a motor, and multiple idler rollers driven to rotate in accordance with the movement of said print medium, wherein at least one of said multiple idler rollers is a sacrificial roller that is more deformable than the other idler rollers.

2. The printing apparatus according to claim 1, further comprising a housing having an inlet and an outlet for said print medium and for accommodating said transport mechanism and said head therein, wherein said sacrificial roller is located near said inlet or said outlet within said housing.

3. The printing apparatus according to claim 2, wherein said sacrificial roller is the second idler roller counting from said inlet or said outlet among said multiple idler rollers.

4. The printing apparatus according to claim 1, further comprising a tension sensor for detecting the tension of said print medium, wherein said control unit extracts a varying component of tension corresponding to said sacrificial roller from time-series data about tension outputted from said tension sensor to detect the deformation of said sacrificial roller, based on said varying component.

5. The printing apparatus according to claim 4, wherein the diameter of an outer peripheral surface of said sacrificial roller that comes into contact with said print medium has a value that is neither an integral multiple nor an integral fraction of the diameter of an outer peripheral surface of the other idler rollers that comes into contact with said print medium.

6. The printing apparatus according to claim 1, wherein said sacrificial roller includes a shaft extending along a central axis thereof, and wherein said shaft has a constricted section.

7. The printing apparatus according to claim 1, wherein said sacrificial roller includes a shaft extending along a central axis thereof, and wherein said shaft has a cavity formed therein.

* * * * *